Aug. 10, 1937.  F. E. WOLCOTT  2,089,521
COFFEE MAKER
Filed Nov. 14, 1935  2 Sheets-Sheet 1

INVENTOR:
FRANK E. WOLCOTT
BY
ATTORNEY.

Aug. 10, 1937.  F. E. WOLCOTT  2,089,521
COFFEE MAKER
Filed Nov. 14, 1935    2 Sheets—Sheet 2
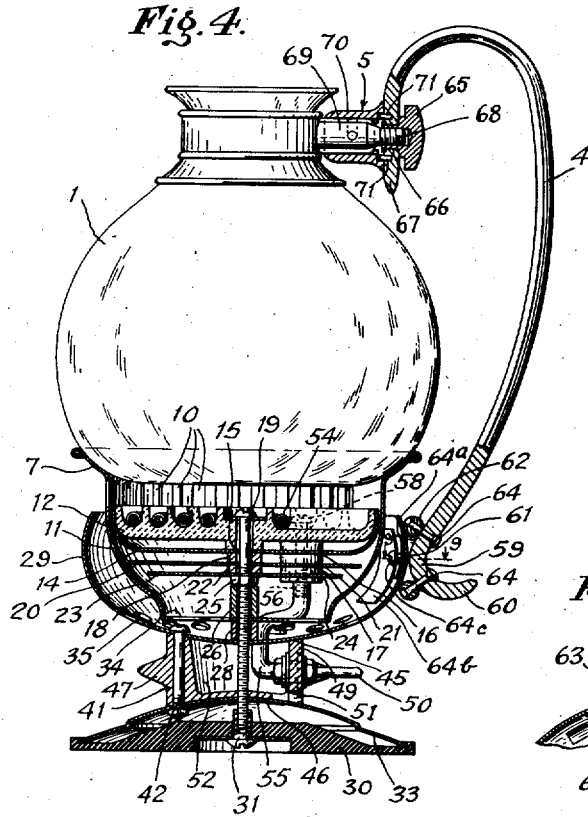
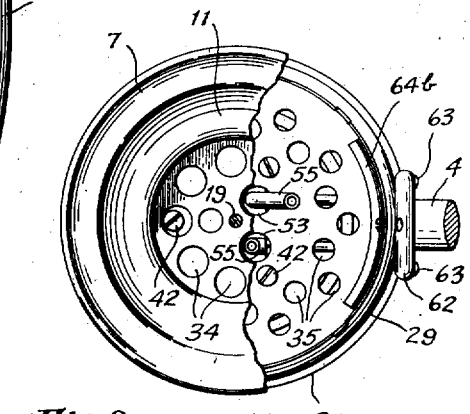
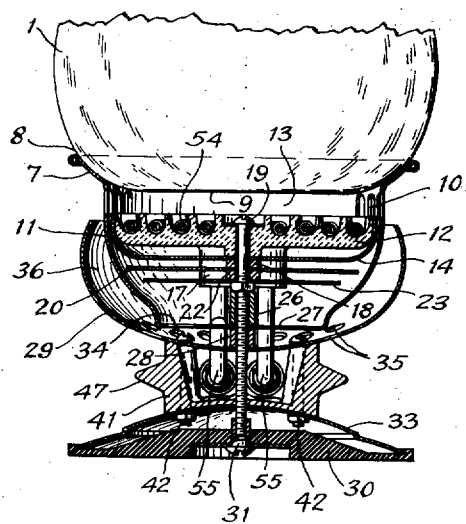
INVENTOR:
FRANK E. WOLCOTT
BY
ATTORNEY.

Patented Aug. 10, 1937

2,089,521

UNITED STATES PATENT OFFICE 2,089,521

COFFEE MAKER

Frank E. Wolcott, West Hartford, Conn., assignor, by mesne assignments, to The Silex Company, a corporation of Connecticut (1936)

Application November 14, 1935, Serial No. 49,802

32 Claims. (Cl. 219—43)

My invention relates to coffee makers.

It has among its objects to provide an improved electric coffee maker, and, more particularly, an improved vacuum type coffee maker wherein the electric heating means and lower bowl are so connected by a handle as to form an improved dispensing unit. A further object of my invention is to provide an improved electric coffee maker including such an improved unit and having improved means whereby it is made possible to keep the temperature of the handle such as to permit grasping the same at any time. A still further object of my invention includes the provision of improved ventilating means for the electric heating means, whereby, at the same time that the lower bowl remains in the unit described, it is also made possible to effect the desired quick cooling of the lower bowl in such manner as to insure the automatic return of the brewed coffee thereto upon the completion of a normal infusion in the upper bowl. Ano er object of my invention is to provide improved electric heater supporting and housing means and improved baffling means beneath the latter, whereby, while obtaining the above objects, it is made possible effectively to insulate the parts against excessive heating while obtaining an improved air circulation. Still further objects of my invention are to provide an improved terminal construction wherein the terminals are effectively and safely housed between the casing housing the heating means and a base, and to provide an improved base adapted to be maintained at the proper temperature and also improved and simplified connecting means for connecting to the base all of the several parts above the latter. Still another object of my invention is to provide improved bowl supporting means, whereby with the bowl disposed between the handle means and the stove, the bowl is so supported as to eliminate all tendency to swing relatively to these elements, at the same time that it is made possible readily and quickly to connect the same in operative position or remove the bowl whenever desired. These and other objects and advantages of my improved construction will, however, hereinafter more fully appear.

In the accompanying drawings, I have shown for purposes of illustration one embodiment which my invention may assume in practice.

In these drawings,—

Fig. 4 is a view similar to Fig. 1 but with the upper bowl removed and with the lower bowl support, the electric heating means, the housing means therefor, and portions of the handle all shown in section;

Fig. 5 is a like section but with the view taken at right angles to the section shown in Fig. 4 and only the bottom portion of the lower bowl being shown;

Fig. 6 is a top plan view with the resistance unit and baffles removed from the inner cup member and the latter also broken away to expose the bottom of the outer cup member;

Fig. 7 is a plan view of the terminal housing structure, the outer bowl of the electric heating means being removed and the conductors leading from the terminals being shown in section;

Fig. 9 is a detail section on line 9—9 of Fig. 4.

Figure 1:
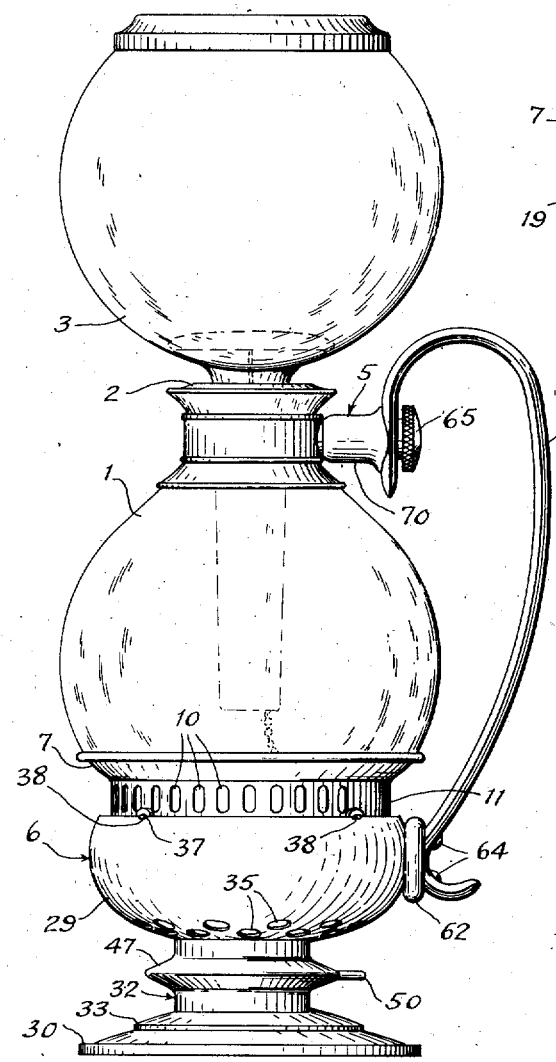
Fig. 1 is a side elevation of a complete vacuum type coffee maker constructed in accordance with this form of my invention.
Figure 2:
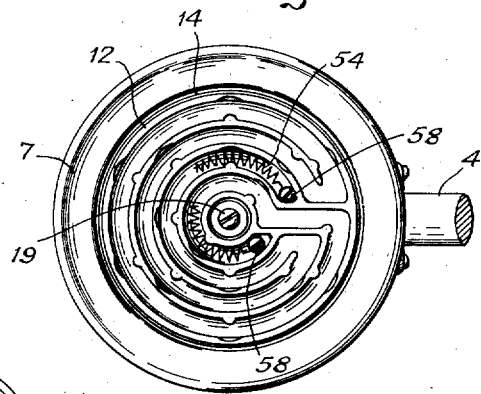
Fig. 2 is a top plan view of the same with the coffee maker removed to expose the lower bowl support and heating element, the handle also being broken away.
Figure 3:
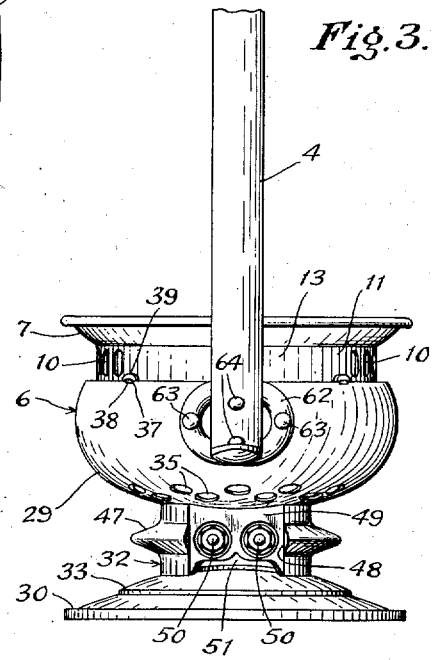
Fig. 3 is an elevation of the structure shown in Fig. 2, the view being taken from the right of the latter figure.
Figure 8:
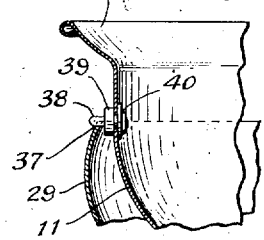
Fig. 8 is a detail sectional view showing one of the supports for supporting the inner cup of the electric heating means on the outer cup thereof.

In this illustrative construction, I have shown a coffee maker of the vacuum type comprising a usual lower bowl 1 operatively connected through a usual seal 2 to an upper bowl 3; the lower bowl 1 herein having its neck removably connected to a handle 4 through connections, generally indicated at 5, described and claimed in my co-pending application, Serial No. 721,951, and the bowl 1 and the handle 4 herein also being supported on and connected to, in an improved manner, an improved lower bowl supporting and electric heating means, generally indicated at 6 and hereinafter more specifically described.

Referring more particularly to these means, it will be noted that the bowl 1 rests on an annular flange or support 7 which corresponds generally to the curvature 8 of the bowl near its bottom and also exposes the bottom 9 of the bowl. Herein, it will also be noted that, as in my co-pending application Serial No. 735,032, now Patent 2,028,033, beneath this flange 7 suitable air apertures 10 are provided in a depending casing or cup 11 and that these apertures are adapted to permit a free flow of air beneath the flange and above a resistance unit 12 carried in the cup 11 and of the general construction described and claimed in my Patent No. 1,983,212. However, the bowl 1 herein is supported wholly on the flange 7 and the openings 10 do not extend clear around the cup beneath the flange 7, an unapertured portion 13 instead being provided in the cup between the spaced end apertures and opposite the bottom extremity of the handle 4. Further, it will be noted that the resistance unit 12 is disposed in a shallow cup 14. This cup herein is imperforate except for a small axial aperture 15 and a pair of conductor apertures 16 receiving depending tubular conductor sheathing members 17 formed of insulating material and preferably integral with the bottom of the unit 12. Also, as shown, this cup 14 preferably quite closely fits the periphery of the unit 12 and is substantially filled thereby, with a central hub of the latter seated on the bottom of the cup. Beneath the cup 14, a coaxial spacer 18, preferably of metal, is also provided, through which an axial connecting screw 19 extends. Further, on this screw below the spacer 18 and within the cup 11, a baffle plate 20 is provided having suitable apertures 21 through which the insulating projections 17 extend, while another like spacer 22 spaces the baffle plate from a second and lower baffle 23 of smaller diameter, likewise axially apertured and also apertured at 24 to receive the members 17. Beneath this lower baffle, a nut 25 is also provided on the screw 19 so that all of the above elements are securely clamped together in the form of a unit. Beneath this nut 25, a metal spacer sleeve 26 is also provided which rests at its lower end upon the bottom 27 of the cup 11, while it will also be noted that beneath the bottom 27 another smaller spacer 28 is provided resting on the bottom of an outer casing member or cup 29, and through both of which the screw 19 extends. Thus, with the lower end of the screw 19 connected to a base member or disc 30, of insulating material, through a suitable threaded nut connection 31, it is possible to clamp both a terminal housing member 32 hereinafter described, and also an inverted raised cover 33 for the base 30, to the cup 29 and clamp the latter to the other elements therein, all in such manner as to permit the single screw 19 to connect all the elements into a single unit.

Next considering the air circulation, it will be noted that the cup 11 is provided with a series of apertures 34 in its bottom, which permit air to flow up around the radiation accelerating baffles 20 and 23 and upward above the edges of these baffles and around the outer periphery of the shallow cup 14 and between the periphery of the latter and the periphery of the cup 11. Further, the cup 11 is supported on its spacer 28 axially within the outer casing or cup 29 and the latter is likewise provided with a series of apertures 35 in its bottom, which communicate both with the apertures 34 and also with a space 36 between the outside wall of the lower end of the cup 11 and the inside wall of the cup 29. Herein, this space is of greater cross section near the bottom of the cup 11 than near the top of the cup 29 so that the two cups 11 and 29 are spaced substantially from each other throughout the greater portion of their length and that a substantial air flow can be provided up inside the upper end of the cup 29 and along the outside of the cup 11. Attention is further directed to the fact that the upper periphery of the cup 29 is provided with a series of notches 37 therein and that a series of pins 38 is seated on these notches and carried by the cup 11 at points adjacent the bottom of the air apertures 10; each of these pins 38, as herein, preferably carrying a spacer 39 between its ends and being suitably attached to the cup 11 as by a turned over head and washer connection 40. As a result of this construction, and with the notches 37 and pins 38 distributed at equal distances around the cups as shown, it will be observed that the inner cup 11 is so spaced from the outer cup 29 as to provide for a flow of air up between these two cups. Accordingly, the cup 11 is provided not only with an internal air flow, leading up inside the same from the apertures 34 in the bottom theerof and having an outlet between the outer periphery of the cup 14 and the inner periphery of the cup 11, but also with an external air flow, entering through the apertures 35 and passing out between the outside of the cup 11 and the inside of the cup 29 and between the radially located spacers 39.

Beneath the cup 29 improved terminal housing means are provided, these herein being between the bottom of the cup 29 and the base 30. As shown, a spacing member 41, herein in the form of a casting, is connected between the bottom of the cup 29 and the top of the cover 33 for the base 30, as, for example, by a plurality of bolts 42, herein three, equally spaced around the member 41 and extending through vertical apertures 44 therein, as shown in Fig. 7. Further, it will be noted that the top 45 and bottom 46 of the member 41 are curved to fit the cup 29 and cover 33, respectively. Thus, when the cover 33 is attached to the cup by the bolts 42 and the axial connecting screw 19 is attached by the nut connection 31 to the base 30, all of the parts will be securely held in their assembled relation, with the lower ends of the bolts 42 spaced above the base 30 due to the provision of the raised cover 33. Attention is, moreover, directed to the fact that the spacer 41 is provided with an annular flange 47, herein projecting laterally therefrom between its top and bottom and providing heat radiating means. As shown, a milled opening 48 is also provided in this flange, having an upright wall 49 and in which the terminals 50 are mounted, all in such manner as to enable the adjacent portions of the flange to provide an effective plug guard well adapted to meet underwriters' requirements. Referring more particularly to the structure of spacer 41 carrying the terminals, it will also be noted that a passage 51 is provided beneath the connection of the terminals 50 to the plate 49, and that this passage 51 leads into a hollow center chamber 52 in the member 41, while this chamber 52 also communicates through a pair of apertures 53 with the inside of the cup 29, these apertures herein, as preferably, being provided in the bottom of this cup and the whole top of the chamber 52 in the member 41 being open. Herein, the terminals 50 are also connected to the resistance element 54 carried by the unit 12 by means of tubular conducting members 55. As shown, these members 55 are connected at one end to the plugs 50 by suitable screw connections and extend laterally therefrom, and then upward through the apertures 53 and suitable apertures in the bottom of the cup 11, and then reversely laterally, and then upwardly beneath the insulating members 17 in which they are axially received. Further, as shown, the upper ends of these members 55 are also preferably screw threaded at 56 to receive terminal screws 58 connected to the opposite ends of the resistance 54 and accessible from the top of the unit 12.

Attention here is, moreover, directed to the improved connecting means provided between the lower end of the handle 4 and the outer cup 29. As shown, it will be noted that the lower end of this handle is bent as at 59, so as to extend close to the cup 29, and then is bent away from the cup, as shown at 60. Between the reversely disposed curved adjacent surfaces on the cup 29 and the end of the handle, and around the point 61 of closest proximity of these two surfaces, I preferably provide a metal ring 62, herein of round cross section and generally oval form. This ring preferably is attached to the cup 29 by rivets or screws 63 at its opposite ends. Further, the lower end of the handle at points above and below its point of closest proximity to the cup is also suitably attached to this ring as by rivets 64 extending angularly to one another, as shown in Fig. 4. As a result of this construction, it will be noted that the heat supplied by conduction to the handle 4 is materially reduced due to the minimization of the contact areas between the round ring 62 and the round cup 29 and the round ring 62 and the curved handle 4. Moreover, such heat as is transmitted to the ring 62 at its two contact points with the cup 29 is to a large extent radiated from the ring 62 in such manner as thereby further to reduce the heat transmitted from the ring 62 to the handle 4 at the two contact points therebetween. Here attention is also directed to the fact that, if desired, even further to reduce the temperature of the handle 4, a plate 64a may be disposed inside the cup 29 and be attached thereto by the rivets 63, and that an additional baffle plate 64b, disposed inside the plate 64a and attached thereto by suitable means such as a screw 64c, may also be provided.

Attention is further directed to the improved results arising from the use of the laterally separable connection, generally indicated at 5, with my improved bowl supporting flange 7 in the combination herein. This connection 5 is of the construction described and claimed in my copending application, Serial No. 721,951, and need not herein be more specifically described than to say that it includes a rotatable nut 65 suitably swiveled as at 66 in a depending portion 67 on the top of the handle 4 and adapted to be threaded, as at 68, to a connecting member 69 carried on the neck of the bowl 1, and which is, in turn, enclosed in and interlocked with a longitudinally separable member 70 connected by vertically spaced dowels 71 to the handle and bodily removable longitudinally with the portion 69 when the latter is released from the nut 65. In my improved construction, it will be noted that it is possible for the lower end of the bowl 1 to be securely positioned in the flange 7 so that there can be no tendency for the bowl to swing out of proper alignment with the heating means, while my improved combination of the flange 7 and neck connecting means 5 also enables the bowl 1 to be disposed in or removed from the flange 7 with facility. Thus, with the connection 5 separated, whenever it is desired to assemble the bowl 1 in operative position, it is possible to lower it vertically directly into the flange 7 with its bottom firmly placed thereon, and then connect the members 69 to the handle by rotating the nut 65 to connect it to the threaded portion 68. Similarly, whenever it is desired to remove the bowl 1, it is only necessary to back off the nut 65 sufficiently to release the threads 68, and then to remove the bowl 1 from the flange 7.

In the use of my improved construction, it will be evident that with the parts assembled as shown in Fig. 1, the coffee making process may be carried out in the manner usual to quick cooling coffee makers, i. e. with the ground coffee placed in the bowl 3 and the water in the bowl 1, and with the water rising into the bowl 3 to infuse the coffee therein, and then being returned as brewed coffee to the bowl 1 within the limits of a normal infusion, all automatically following the interruption of current flow to the heating unit 12. During current flow, it will be observed that the heat from the unit 12 will act upon the bottom 9 of the bowl 1, while the latter is supported on the flange 7, with the heated air rising from the unit passing laterally out through the openings 10 and with air flows being induced up through the inner cup 11 and between the latter and the outer cup 29. Further, it will be particularly noted that upon cessation of current flow, these flows will be continued in such manner as to reduce the temperature of the parts below the bowl bottom 9, i. e. so that the bowl 1 will be sufficiently cooled within the limits of a normal infusion to cause the brewed coffee in the upper bowl 3 to return to the bowl 1 ready for dispensing. Further, with the brewed coffee thus in bowl 1, it will be evident that the bowl 3 may be removed in the usual manner, and coffee then dispensed from the bowl 1 by simply grasping the handle 4 and using the unit comprising this bowl with the handle 4 and the supporting and heating means 6, as a dispensing unit. In connection with the handle 4 it will also be observed that, due to the effective cooling means provided, it is made possible for this handle 4 to be kept at a comfortable temperature for handling at all times, despite the high temperature generated by the unit 12 and the fact that the handle 4 and all parts of the supporting and heating element 6 other than the shallow refractory base of the unit 12, are formed of metal. In producing this result, it will be noted that heat storage in the element 6 is minimized through the use of the baffle means and the air passage means heretofore described, while the supply of heat to the lower end of the handle is reduced by the elimination of the apertures 10 adjacent the lower end of the handle and the provision of the ring connection 62 also heretofore described, as well as the supplementary baffle means inside the cup 29.

As a result of my improved construction, it will be evident that it is not only possible for the bowl 1 to remain upon the stove during the latter part of the coffee making operation, i. e. while the bowl is being cooled sufficiently to enable the return of the brewed coffee thereto, but also possible for this bowl to remain upon the stove during dispensing. Thus, apart from the need for removing the lower bowl for cleansing, all necessity for removing the latter from the stove, as a necessary part of the coffee making operation or as a preliminary to dispensing, is wholly eliminated. Accordingly, after current has been supplied for a sufficient time, all that it is necessary to do is to shut off the current; and, after the brewed coffee has been automatically returned to the bowl 1 within the limits of a normal infusion, then remove the upper bowl 3 and dispense the brewed coffee from the bowl 1. Further, it will be noted that the construction is such that the unit produced is exceedingly well balanced and adapted to convenient use, while also being adapted to use without any danger of separation of the parts or any need of either returning the same to assembled relation with a separate stove or requiring any separate handling of the stove as, for example, incident to the removal thereof. Thus, as compared with previous quick cooling coffee makers having a separate stove, an improved and simplified structure is produced eliminating the separate stove, while increasing the convenience and facility with which the device may be used, and also eliminating the need for returning the coffee maker during dispensing to the stove or any other heat insulating support. Also, as compared with previous coffee makers of the non-quick cooling type and having a separate stove, all necessity for lifting off the coffee maker from the stove to permit the return of the brewed coffee to the dispensing bowl, is also eliminated.

Attention is further directed to the fact that as a result of my improved construction, I eliminate all possibility of accidentally or carelessly returning the dispensing bowl to an improper position on the stove so that the same may tilt, and also all danger that the coffee maker will be accidentally hit and knocked off the separate stove, the lower bowl being so attached to the unit of which it forms a part, and the weight of the unit so disposed below the bowl, as effectually to prevent the separation of the bowl from the unit, and minimize upsetting of the unit. Due to my improved connection between the bowl and the unit, it will also be observed that whenever it is desired to remove the bowl, as, for example, for cleaning, this may be readily and quickly done. Attention is also directed to the fact that under all conditions the handle 4 is kept within normal temperature limits, while permitting substantially all of the bowl supporting and heating means to be formed of metal in such manner as to produce an exceedingly attractive structure adapted to long use in service. These and other advantages of my improved construction will, however, be clearly apparent to those skilled in the art.

While I have in this application specifically described one embodiment which my invention may assume in practice, it will be understood that this form of the same is chosen for purposes of illustration and that the invention may be modified and embodied in various other forms without departing from its spirit or the scope of the appended claims.

What I claim as new and desire to secure by Letters Patent is:—

1. An electric coffee maker comprising electric stove, handle, bowl supporting means operatively connected to form a dispensing unit supported by said stove, and cooling means for said electric stove means likewise reducing the temperature of said handle means.

2. An electric coffee maker comprising electric stove, handle, bowl supporting means operatively connected to form a dispensing unit supported by said stove, and cooling means for said electric stove means and handle means including baffle means beneath said stove and cooperating air passage forming means.

3. An electric coffee maker comprising nested spaced inner and outer casings, electric stove, handle, and bowl supporting means operatively connected to form a dispensing unit, said stove and supporting means being at opposite ends of said handle means and said inner casing enclosing said stove and said outer casing enclosing said inner casing and carrying said handle.

4. In a coffee maker, nested spaced inner and outer casing members, electric heating means fixed within the inner casing, an upright handle having its lower end fixed to said outer casing and supported thereby, a lower bowl fixed to the upper end of said handle and disposed in operative relation over said electric heating means, and bowl receiving and supporting means on said inner casing projecting above said heating means and positioning the bottom portion of said bowl in spaced relation to and above said heating means.

5. In a coffee maker, a casing having electric heating means fixed therein, an outer spaced casing enclosing said first mentioned casing, an upright handle having its lower end fixed to said outer casing and supported thereby, a lower bowl fixed to the upper end of said handle and disposed in operative relation over said electric heating means, bowl supporting means on said inner casing projecting above said heating means and positioning the bottom portion of said bowl in spaced relation to and above said heating means, and passage forming means in said casings for inducing air flows through both of said casings.

6. In a coffee maker, a casing having electric heating means fixed therein, an outer spaced casing enclosing said first mentioned casing, an upright handle having its lower end fixed to said outer casing and supported thereby, a lower bowl fixed to the upper end of said handle and disposed in operative relation over said electric heating means, bowl supporting means on said inner casing projecting above said heating means and positioning the bottom portion of said bowl in spaced relation to and above said heating means, lateral air passage forming means in said inner casing below said supporting means, and air supply passage forming means within said casings for inducing air flows leading up through said casings to the opposite sides of said lateral passage forming means.

7. In a coffee maker, a casing having electric heating means fixed therein, an upright handle having its lower end fixed to said casing and supported thereby, a lower bowl fixed to the upper end of said handle and disposed in operative relation over said electric heating means, and bowl supporting means on said casing positioning the bottom portion of said bowl above said heating means, said casing comprising a plurality of open topped cup members disposed in spaced nested relation and one housing said heating means and carrying said supporting means and the other enclosing a portion of said first mentioned member and carrying said handle.

8. In a coffee maker, a casing having electric heating means fixed therein, an upright handle having its lower end fixed to said casing and supported thereby, a lower bowl fixed to the upper end of said handle and disposed in operative relation over said electric heating means, and bowl supporting means on said casing positioning the bottom portion of said bowl above said heating means, said casing comprising a plurality of open topped cup members disposed in spaced nested relation and one carrying said supporting means and the other enclosing said first mentioned member and carrying said handle and each having passage forming means leading up through the same.

9. In a coffee maker, a casing having electric heating means fixed therein, an upright handle having its lower end fixed to said casing and supported thereby, a lower bowl fixed to the upper end of said handle and disposed in operative relation over said electric heating means, and bowl supporting means on said casing positioning the bottom portion of said bowl above said heating means and having lateral air passage means beneath a bowl on said supporting means, said casing comprising a plurality of open topped cup members disposed in spaced nested relation and and one housing said heating means and carrying said supporting means and the other enclosing said first mentioned cup member and carrying said handle and each having passage forming means leading up through the same and one passage forming means delivering inside said lateral passage means and the other outside the same.

10. In an electric coffee maker stove, cooperating inner and outer casing members, one having electric heating means therein and also carrying bowl supporting means thereon, and the other enclosing a lower portion of said last mentioned casing member and having the latter supported thereon.

11. In an electric coffee maker stove, cooperating inner and outer casing members, one having electric heating means therein and also carrying bowl supporting means thereon and having air escape means opening laterally from above said heating means and below said supporting means, and the other enclosing a lower portion of said last mentioned casing member and having the latter supported thereon.

12. In an electric coffee maker stove, cooperating inner and outer members, one having electric heating means therein and also carrying bowl supporting means thereon, and the other enclosing a lower portion of said last mentioned casing member and having the latter supported thereon, said inner casing member having communicating inlet and outlet passage forming means respectively below and above said heating means.

13. In an electric coffee maker stove, cooperating inner and outer casing members, one having electric heating means therein and also carrying bowl supporting means thereon, and the other enclosing a lower portion of said last mentioned casing member and having the latter supported thereon, said outer casing member having inlet means below said inner casing member and leading upward along the exterior thereof.

14. In an electric coffee maker stove, cooperating inner and outer casing members, one having electric heating means therein and also carrying bowl supporting means thereon and having air escape means opening laterally from said heating means below said supporting means, and the other enclosing said last mentioned casing member and having the latter supported thereon at radially spaced points, said outer casing member having inlet means below said inner casing member and leading upward along the exterior thereof and also upward through said inner member around said heating means.

15. A coffee maker stove comprising an open topped casing member, a refractory resistance carrying unit therein. an imperforate cup receiving said unit and enclosed in said casing member, baffle means in said casing member beneath said cup, and air circulating passage forming means leading upward through said casing member relative to said baffle means and around the periphery of said cup.

16. A coffee maker stove comprising an open topped casing member, a refractory resistance carrying unit therein, an imperforate cup receiving said unit and enclosed in said casing member, baffle means in said casing member beneath said cup, and air circulating passage forming means leading upward through said casing member delivering air on said baffle means and around the periphery of said cup, said baffle means comprising a plurality of baffle members spaced below said cup and from one another.

17. A coffee maker stove comprising a casing member, a refractory resistance carrying unit therein, a cup encasing said unit, baffle means beneath said cup, and air circulating passage means leading upward through said casing member around the periphery of said cup, said baffle means comprising a plurality of baffle members spaced below said cup and from one another and said unit having insulating conductor receiving members extending through said baffle members.

18. In an electric stove, electric heating means having a casing and a base, a spacing member between said casing and base, and projecting terminals for said heating means carried by said spacing member, said spacing member carrying spaced means forming plug guards on opposite sides of said projecting terminals.

19. In an electric stove, electric heating means having a casing and a base, a spacing member between said casing and base, and terminals for said heating means carried by said spacing member, said spacing member having flange means thereon and a cut away portion therein forming a plug guard adjacent said terminals.

20. In an electric stove, electric heating means, housing means therefor, a base beneath said housing means, baffle means in said housing means, axial connecting means connecting said electric heating means, baffle means, housing means and base into a unit, and an external open topped housing member enclosing said first mentioned housing means and likewise connected into said unit by said axial means.

21. In an electric stove, electric heating means, housing means therefor, a base beneath said housing means, baffle means in said housing means, axial connecting means connecting said electric heating means, baffle means, housing means and base into a unit, and a terminal carrying member between said house and base likewise connected into said unit by said axial means.

22. In an electric stove, electric heating means, housing means therefor, a base beneath said housing means, baffle means in said housing means, axial means for connecting said electric heating means, baffle means, housing means and base into a unit, an external housing member enclosing said first mentioned house and likewise connected into a unit by said axial means, and a terminal carrying member between said house and base likewise connected into said unit by said axial means.

23. In an electric stove, a heating unit and resistance means, a stove body carrying said unit and having a base and terminals connectable to said resistance means, tubular conducting members connected to said terminals and leading through said stove to said unit, and screws on said unit connected to said resistance means and threaded in said tubular conducting members.

24. In an electric stove, a heating unit and resistance means, a stove body carrying said unit and having a base and terminals connectable to said resistance means, tubular conducting members connected to said terminals and leading through said stove to said unit, and screws on said unit connected to said resistance means and threaded in said tubular conducting members, said unit being of refractory material and having extensions thereon receiving said screws and the ends of said conducting members therein.

25. In an electric stove, a heating unit and resistance means, a stove body carrying said unit and having a base and terminals connectable to said resistance means, tubular conducting members connected to said terminals and leading through said stove to said unit, screws on said unit connected to said resistance means and threaded in said tubular conducting members, said unit being of refractory material, with extensions thereon receiving said screws and the ends of said conducting members therein, and baffle means beneath said unit and insulated from said conducting members by said extensions.

26. In an electric stove, a heating unit and resistance means, a stove body carrying said unit and having a base and terminals connectable to said resistance means, tubular conducting members connected to said terminals and leading through said stove to said unit, screws on said unit connected to said resistance means and threaded in said tubular conducting members, said unit being of refractory material and having extensions thereon receiving said screws and the ends of said conducting members therein, a cup enclosing said refractory unit, and baffle means disposed beneath said cup, said cup and baffle means having said extensions extending therethrough and insulating said conducting members.

27. In an electric coffee maker, an electric stove having a casing, an outer spaced casing enclosing said first mentioned casing, a handle carrying a bowl support above said stove, and heat insulating connecting means between the lower end of said handle and said outer casing.

28. In an electric coffee maker, an electric stove having a casing, a handle carrying a bowl support above said stove, and heat insulating connecting means between the lower end of said handle and said casing comprising a ring carried on the outer face of said casing and a curved portion on said handle engaging said ring at spaced points.

29. In an electric coffee maker, an electric stove having a casing, a handle carrying a bowl support above said stove, and heat insulating connecting means between the lower end of said handle and said casing comprising baffle means inside said casing opposite the lower end of said handle and means outside said casing connecting said handle thereto and engaging each of the same at a plurality of spaced points.

30. An electric stove having a heating unit, an open topped casing member enclosing the latter, a cooperating open topped casing member spaced from said first mentioned casing member and surrounding the latter, means for providing cooling air flows upward inside said first mentioned casing member and between the latter and the outer casing member, bowl supporting means disposed in spaced relation above said heating unit, and passage forming means beneath said supporting means affording free lateral communication with the atmosphere between said heating unit and said supporting means.

31. In an electric coffee maker, an electric stove having a heating unit, an open topped casing member enclosing the latter, a cooperating casing member spaced from said first mentioned casing member and surrounding the latter, means for providing cooling air flows upward inside said first mentioned casing member and between the latter and the outer casing member, and a handle carrying a bowl support above said stove and having its lower end fixed to said outer casing member.

32. An electric stove having a heating unit, an open topped casing member enclosing the latter, a cooperating open topped casing member spaced from said first mentioned casing member and surrounding the later, an imperforate open topped cup encasing said resistance unit and disposed in said first mentioned casing member, a plurality of baffles disposed in spaced relation in said first mentioned casing member below said cup, and means for providing air flows up inside and outside said first mentioned casing member.

FRANK E. WOLCOTT.

CERTIFICATE OF CORRECTION.

Patent No. 2,089,521.   August 10, 1937.

FRANK E. WOLCOTT.

It is hereby certified that error appears in the printed specification of the above numbered patent requiring correction as follows: Page 2, second column, line 12, for "theerof" read thereof; page 4, second column, line 18, claim 5, before "passage" insert the words air flow; page 5, first column, line 2, claim 9, strike out "and"; page 6, second column, line 36, claim 32, for "later" read latter; and that the said Letters Patent should be read with these corrections therein that the same may conform to the record of the case in the Patent Office.

Signed and sealed this 19th day of October, A. D. 1937.

(Seal)

Henry Van Arsdale.
Acting Commissioner of Patents.

sistance means, a stove body carrying said unit and having a base and terminals connectable to said resistance means, tubular conducting members connected to said terminals and leading through said stove to said unit, screws on said unit connected to said resistance means and threaded in said tubular conducting members, said unit being of refractory material, with extensions thereon receiving said screws and the ends of said conducting members therein, and baffle means beneath said unit and insulated from said conducting members by said extensions.

26. In an electric stove, a heating unit and resistance means, a stove body carrying said unit and having a base and terminals connectable to said resistance means, tubular conducting members connected to said terminals and leading through said stove to said unit, screws on said unit connected to said resistance means and threaded in said tubular conducting members, said unit being of refractory material and having extensions thereon receiving said screws and the ends of said conducting members therein, a cup enclosing said refractory unit, and baffle means disposed beneath said cup, said cup and baffle means having said extensions extending therethrough and insulating said conducting members.

27. In an electric coffee maker, an electric stove having a casing, an outer spaced casing enclosing said first mentioned casing, a handle carrying a bowl support above said stove, and heat insulating connecting means between the lower end of said handle and said outer casing.

28. In an electric coffee maker, an electric stove having a casing, a handle carrying a bowl support above said stove, and heat insulating connecting means between the lower end of said handle and said casing comprising a ring carried on the outer face of said casing and a curved portion on said handle engaging said ring at spaced points.

29. In an electric coffee maker, an electric stove having a casing, a handle carrying a bowl support above said stove, and heat insulating connecting means between the lower end of said handle and said casing comprising baffle means inside said casing opposite the lower end of said handle and means outside said casing connecting said handle thereto and engaging each of the same at a plurality of spaced points.

30. An electric stove having a heating unit, an open topped casing member enclosing the latter, a cooperating open topped casing member spaced from said first mentioned casing member and surrounding the latter, means for providing cooling air flows upward inside said first mentioned casing member and between the latter and the outer casing member, bowl supporting means disposed in spaced relation above said heating unit, and passage forming means beneath said supporting means affording free lateral communication with the atmosphere between said heating unit and said supporting means.

31. In an electric coffee maker, an electric stove having a heating unit, an open topped casing member enclosing the latter, a cooperating casing member spaced from said first mentioned casing member and surrounding the latter, means for providing cooling air flows upward inside said first mentioned casing member and between the latter and the outer casing member, and a handle carrying a bowl support above said stove and having its lower end fixed to said outer casing member.

32. An electric stove having a heating unit, an open topped casing member enclosing the latter, a cooperating open topped casing member spaced from said first mentioned casing member and surrounding the later, an imperforate open topped cup encasing said resistance unit and disposed in said first mentioned casing member, a plurality of baffles disposed in spaced relation in said first mentioned casing member below said cup, and means for providing air flows up inside and outside said first mentioned casing member.

FRANK E. WOLCOTT.

CERTIFICATE OF CORRECTION.

Patent No. 2,089,521.  August 10, 1937.

FRANK E. WOLCOTT.

It is hereby certified that error appears in the printed specification of the above numbered patent requiring correction as follows: Page 2, second column, line 12, for "theerof" read thereof; page 4, second column, line 18, claim 5, before "passage" insert the words air flow; page 5, first column, line 2, claim 9, strike out "and"; page 6, second column, line 36, claim 32, for "later" read latter; and that the said Letters Patent should be read with these corrections therein that the same may conform to the record of the case in the Patent Office.

Signed and sealed this 19th day of October, A. D. 1937.

(Seal)

Henry Van Arsdale.
Acting Commissioner of Patents.

CERTIFICATE OF CORRECTION.

Patent No. 2,089,521. August 10, 1937.

FRANK E. WOLCOTT.

It is hereby certified that error appears in the printed specification of the above numbered patent requiring correction as follows: Page 2, second column, line 12, for "theerof" read thereof; page 4, second column, line 18, claim 5, before "passage" insert the words air flow; page 5, first column, line 2, claim 9, strike out "and"; page 6, second column, line 36, claim 32, for "later" read latter; and that the said Letters Patent should be read with these corrections therein that the same may conform to the record of the case in the Patent Office.

Signed and sealed this 19th day of October, A. D. 1937.

(Seal)

Henry Van Arsdale.
Acting Commissioner of Patents.